United States Patent [19]

Yamaguchi

[11] Patent Number: 5,020,738
[45] Date of Patent: Jun. 4, 1991

[54] FISHING REEL ANTI-REVERSE MECHANISM

[75] Inventor: Nobuyuki Yamaguchi, Tokyo, Japan
[73] Assignee: Daiwa Seiko, Inc., Tokyo, Japan
[21] Appl. No.: 507,797
[22] Filed: Apr. 12, 1990

Related U.S. Application Data

[60] Division of Ser. No. 453,060, Dec. 13, 1989, abandoned, which is a continuation of Ser. No. 235,993, Aug. 24, 1988, abandoned.

[30] Foreign Application Priority Data

Aug. 28, 1987 [JP] Japan ................. 62-1322079
Aug. 29, 1987 [JP] Japan ................. 62-131739

[51] Int. Cl.⁵ .......................................... A01K 89/033
[52] U.S. Cl. ...................................... 242/298; 242/247
[58] Field of Search ............... 242/298, 297, 301, 247

[56] References Cited

U.S. PATENT DOCUMENTS 2,573,074 10/1951 Von Pein ........................... 242/301
2,745,607 5/1956 Taggart et al. .
3,612,437 10/1971 Allebach et al. .
4,179,084 12/1979 Noda .
4,763,856 8/1988 Kaneko .

FOREIGN PATENT DOCUMENTS

55-32463 8/1980 Japan .
59-32282 9/1984 Japan .

Primary Examiner—Joseph J. Hail, III
Attorney, Agent, or Firm—Kalish & Gilster

[57] ABSTRACT

A fishing reel has an anti-reverse mechanism for preventing a rotary member such as a spool, rotor, etc. from being undesirably rotated by the pulling force acting in the direction in which the fishing line is unwound. The anti-reverse mechanism is comprised of a one-way bearing which is connected to the reel body through a ratchet wheel and a pawl. Therefore, it is possible to effect a reliable anti-reverse operation and minimize the slipping angle and impact force at the time when anti-reverse operation is effected.

1 Claim, 6 Drawing Sheets

FIG.10

FISHING REEL ANTI-REVERSE MECHANISM

CROSS-REFERENCE TO RELATED APPLICATIONS

This is a division of copending application Ser. No. 07/453,060, filed Dec. 13, 1989, which is continuation of application Ser. No. 07/235,993, filed Aug. 24, 1988, both abandoned.

BACKGROUND OF THE INVENTION

The present invention relates to a fishing reel and, more particularly, to an improvement in an anti-reverse mechanism for preventing a rotary member such as a spool, rotor, etc. from being undesirably rotated by the pulling force acting in the direction in which the fishing line is unwound.

There have heretofore been known anti-reverse mechanisms for fishing reels such as those disclosed in Japanese Utility Model Publication Numbers 55-32463 (1980) and 59-32282 (1984).

This type of conventional anti-reverse mechanism is arranged such that a ratchet wheel is rigidly secured to a rotating shaft which is rotated by turning a handle, while a pawl member which is brought into and out of engagement with the ratchet wheel is pivotally mounted on a reel frame, and the pawl member is retained in engagement with the ratchet wheel by means of a spring, whereby the rotating shaft is prevented from rotating in the direction in which the line is unwound but allowed to rotate in the retrieving direction, that is, the direction in which the line is rewound in response to the rotation of the handle in the retrieving direction.

The above-described conventional anti-reverse mechanism for fishing reels suffers, however, from the following problems. Since it comprises parts which are additionally provided, i.e., a ratchet wheel, a pawl member, a screw required to pivotally mount the pawl member on the reel frame, and a spring member for retaining the pawl member in engagement with the ratchet wheel, the number of parts increases and it is not easy to assemble and disassemble these parts. In addition, since the conventional anti-reverse mechanism is constructed by setting discrete parts on the rotating shaft and the reel frame, there is a fear of failure in prevention of reverse rotation due to an error in machining or assembling these parts.

In the anti-reverse mechanism of the type described above, the number of teeth of the ratchet wheel is generally 6 to 8. Therefore, even in the case of a ratchet wheel having 8 teeth, the angle between each adjacent teeth is relatively large, i.e., 45°. Accordingly, the angle required for the ratchet wheel and the pawl member which are brought into engagement with each other to come to prevent reverse rotation, that is, the slipping angle, is unfavorably large, so that the following problems have heretofore been experienced.

For example, when a fishing line is let out from a spinning reel, if the rod is vigorously swung down with the bail set free, the handle arm rotates by inertia through an angle corresponding to the slipping angle. At this time, if the bail arm bumps against the bail return member provided on the reel body, the bail is returned to the retrieve position and, at the same time, the line which is being let out is suddenly stopped by the bail which is prevented from rotating in reverse, so that there is a fear of the line being disconnected by the tension accidentally applied thereto.

When the fishing rod is vigorously pulled due to a trouble such as the hook being caught by an obstacle on the bottom of the water, large impact force acts on the ratchet wheel and the pawl member which are engaged with each other to prevent reverse rotation, which is likely to result in damage to the pawl member or other parts. In addition, the relatively large slipping angle involves the problem that the line is likely to slack.

SUMMARY OF THE INVENTION

It is an object of the present invention to provide a fishing reel which is designed so that it is possible to facilitate the assembling and disassembling operations, eliminate a failure in prevention of reverse rotation and effect an anti-reverse operation with a minimized slipping angle and a minimized impact.

It is another object of the present invention to provide a fishing reel which is designed so that it is possible to reliably prevent reverse rotation by minimizing the slipping angle and it is also possible to eliminate the fear of the line slacking or being disconnected by minimizing the impact applied thereto at the time when the anti-reverse operation is effected.

To these ends, the present invention provides a fishing reel of the type in which the rotation of a handle supported on a reel body is transmitted to a spool through a rotation transmission system incorporated in the reel body, wherein the improvement comprises a one-way bearing which allows rotation in one direction but blocks rotation in the other direction, the one-way bearing being disposed between a rotary member rotated by actuating said handle and the reel body that supports the rotary member.

By virtue of the above-described arrangement, the one-way bearing which is interposed at the support portion of a rotary member such as a flyer shaft, a driving shaft or the like blocks reverse rotation of the rotary member. Thus, it is possible to effect a reliable anti-reverse operation with minimized impact force and also possible to unitize the anti-reverse mechanism.

According to another aspect of the present invention, there is provided a fishing reel of the type in which the rotation of a handle supported on a reel body is transmitted to a spool through a rotation transmission system incorporated in the reel body, wherein the improvement comprises: a one-way bearing fitted on the outer periphery of a rotary member rotated by actuating the handle; a ratchet wheel fitted on the outer periphery of the one-way bearing in such a manner that the ratchet wheel is unable to rotate relative to the bearing; and a pawl disengageably engaged with the ratchet wheel.

Thus, according to the present invention, an anti-reverse mechanism is comprised of a one-way bearing which is connected to the reel body through a ratchet wheel and a pawl. Therefore, it is possible to effect a reliable anti-reverse operation and minimize both the slipping angle and impact force at the time when an anti-reverse operation is effected.

DESCRIPTION OF THE PREFERRED EMBODIMENTS

Embodiments of the present invention will be described hereinunder with reference to the accompanying drawings.

Figure 1:
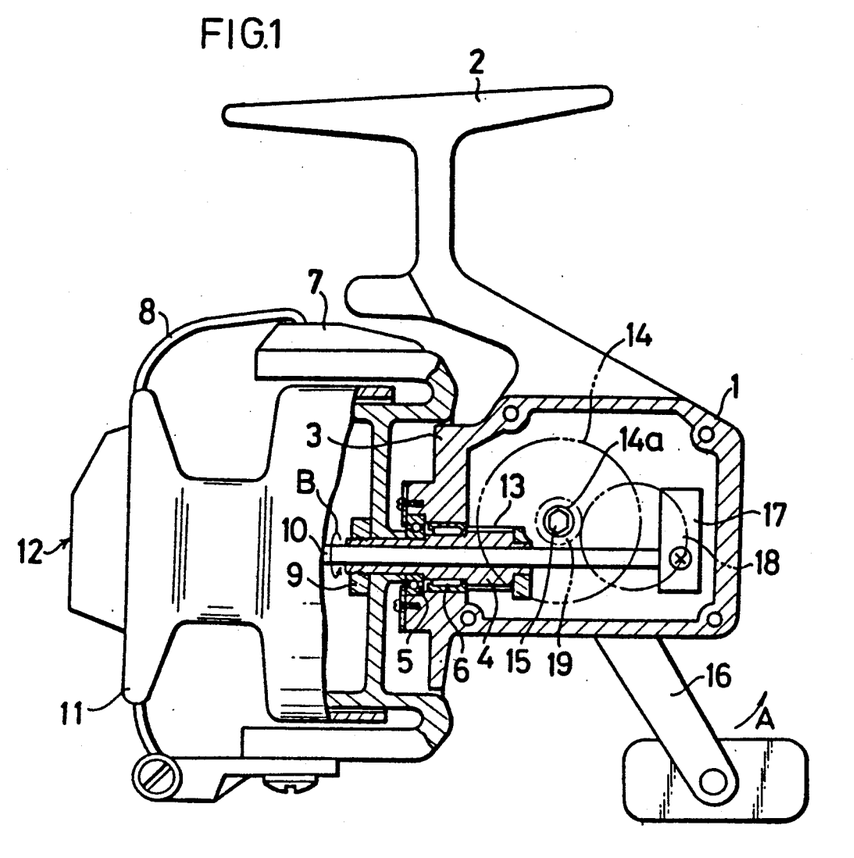
FIG. 1 is a partially-sectioned side view showing a first embodiment in which the anti-reverse mechanism according to the present invention is applied to a spinning reel.

FIG. 1 is a partially-sectioned side view of a spinning reel having an anti reverse mechanism according to the present invention.

In the figure, the reference numeral 1 denotes a reel body having a mounting leg 2 which is secured to a fishing rod when the reel is mounted thereon. A hollow flyer shaft 4 extends perpendicularly through a front wall 3 of the reel body 1. The flyer shaft 4 is rotatably carried by a radial bearing 5 and, at the same time, supported by a roller type one-way bearing 6 which is fitted in the front wall 3, whereby the flyer shaft 4 is allowed to rotate in the retrieving direction but prevented from rotating in the direction in which the line is unwound. In other words, the one-way bearing 6 constitutes an anti-reverse mechanism. The reference numeral 7 denotes a flyer which is disposed at the front side of the reel body 1. The flyer 7 has a bail 8 and is concentrically fitted on that portion of the flyer shaft 4 which projects outward from the reel body 1. The flyer 7 is rigidly fastened to the flyer shaft 4 by means of a nut 9 which is screwed onto the shaft 4. The reference numeral 10 denotes a spool shaft which extends through the bore in the flyer shaft 4 and which is supported therein in such a manner that it is rotatable as well as axially slidable. A spool 11 is mounted on the forward projecting end portion of the spool shaft 10 in such a manner that the spool 11 is rotatable about the axis of the spool shaft 10. The spool 11 and the spool shaft 10 are coupled together through a drag mechanism 12.

Further, in FIG. 1, the reference numeral 13 denotes a pinion which is integrally formed on the outer periphery of that portion of the flyer shaft 4 which projects inside the reel body 1, the pinion 13 being meshed with a driving gear 14 which is disposed inside the reel body 1. A hollow driving shaft 14a of the driving gear 14 is rotatably carried by the reel body 1 in such a manner that the driving shaft 14a extends perpendicular to the spool shaft 10. A handle shaft 15 is rigidly fitted into the hollow driving shaft 14a, and a handle 16 for winding in the line is secured to that end portion of the handle shaft 15 which projects outward from the reel body 1. The reference numeral 17 denotes an oscillation actuating member which is secured to that portion of the spool shaft 10 which projects inside the reel body 1 in such a manner that the actuating member 17 is rotatable relative to the spool shaft 10 but immovable axially thereof. The actuating member 17 is connected to an oscillating gear 18 which is in mesh with a gear 19 which is rigidly secured to the hollow driving shaft 14a.

The following is a description of the operation of the spinning reel according to this embodiment arranged as described above.

When the handle 16 is turned in the direction of the arrow A shown in FIG. 1, the rotation of the handle 16 is transmitted to the flyer shaft 4 through the hollow driving shaft 14a, the driving gear 14 and the pinion 13, thus causing the flyer shaft 4 to rotate in the direction of the arrow B shown in FIG. 1. At this time, the one-way bearing 6 supporting the flyer shaft 4 does not restrain the rotation of the shaft 4.

As the flyer shaft 4 rotates in the direction of the arrow B, the flyer 7 which is connected to the shaft 4 in one unit is rotated in the same direction as that of rotation of the flyer shaft 4, and the bail 8 rotates around the spool 11. As a result, the fishing line (not shown) which is guided by the bail 8 is wound on the spool 11, as is well known. At the same time, the rotation of the hollow driving shaft 14a caused by the operation of the handle 16 is transmitted to the oscillating gear 18 through the gear 19, thus causing the gear 18 to rotate. As a result, the actuating member 17 which is connected to the gear 18 actuates both the spool shaft 10 and the spool 11 to reciprocate along the axis of the shaft 10, thus allowing the line to be uniformly wound on the spool 11.

When pulling force acts on the line in the direction in which it is unwound, the flyer 7 is urged to rotate in the reverse direction to the retrieving direction (the direction of the arrow B in FIG. 1), but the one-way bearing 6 supporting the flyer shaft 4 is activated by the rotation of the flyer shaft 4 in the reverse direction to the direction of the arrow B so as to block the shaft 4 from rotating in the reverse direction. In other words, the flyer 7 is prevented from rotating in reverse. When larger pulling force acts on the line due to a sudden tug or turn of a fish and the pulling force exceeds the drag force of the drag mechanism 12, the spool 11 rotates while slipping relative to the spool shaft 10 in the direction in which the line is unwound, thereby preventing disconnection of the line.

In the foregoing embodiment, the mechanism for preventing reverse rotation of the flyer 7 is constituted by the one-way bearing 6 and therefore the anti-reverse mechanism can be unitized. Accordingly, the assembly and disassembly of the mechanism are facilitated and thus superior operability is obtained. In addition, since the one-way bearing 6 is of the type that rollers which constitute the bearing 6 are engaged in the shape of wedges between the flyer shaft 4 and an outer ring to thereby perform a locking operation, the slipping angle is small and it is unlikely that a failure in prevention of reverse rotation will occur. Thus, it is possible to reliably prevent reverse rotation of the spool 11. Further, the impact applied when the anti-reverse operation is effected, and it is therefore unlikely that a trouble will occur.

Figure 2:
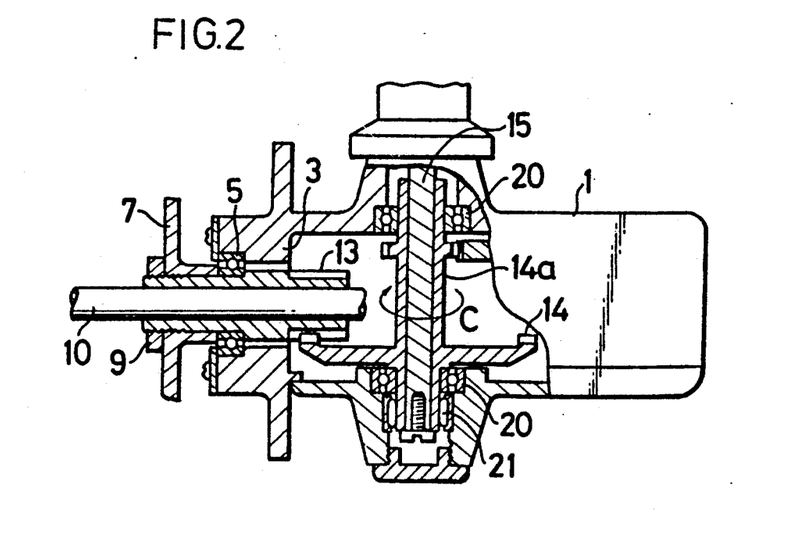
FIG. 2 is a fragmentary sectional view showing a second embodiment of the present invention.

FIG. 2 is a fragmentary sectional view showing a second embodiment in which the one-way bearing for prevention of reverse rotation according to the present invention is provided on the handle shaft of a spinning reel.

In FIG. 2, the same members or portions as those in FIG. 1 are denoted by the same reference numerals, and description of the same elements as those in the first embodiment is omitted. The second embodiment will be explained with emphasis on elements which are different from those shown in FIG. 1.

In this embodiment, as will be clear from FIG. 2, a hollow driving shaft 14a is rotatably carried by the reel body 1 through radial bearings 20, and one end portion of the driving shaft 14a is fitted in a one-way bearing 21 which is rigidly secured to the reel body 1 in close proximity to one of the radial bearings 20, whereby the hollow driving shaft 14a of the driving gear 14 is allowed to rotate in one direction, that is, the retrieving direction (the direction of the arrow C shown in FIG. 2), but blocked from rotating in the reverse direction thereto.

In the second embodiment arranged as described above also, the same advantages as those in the first embodiment are obtained.

Figure 3:
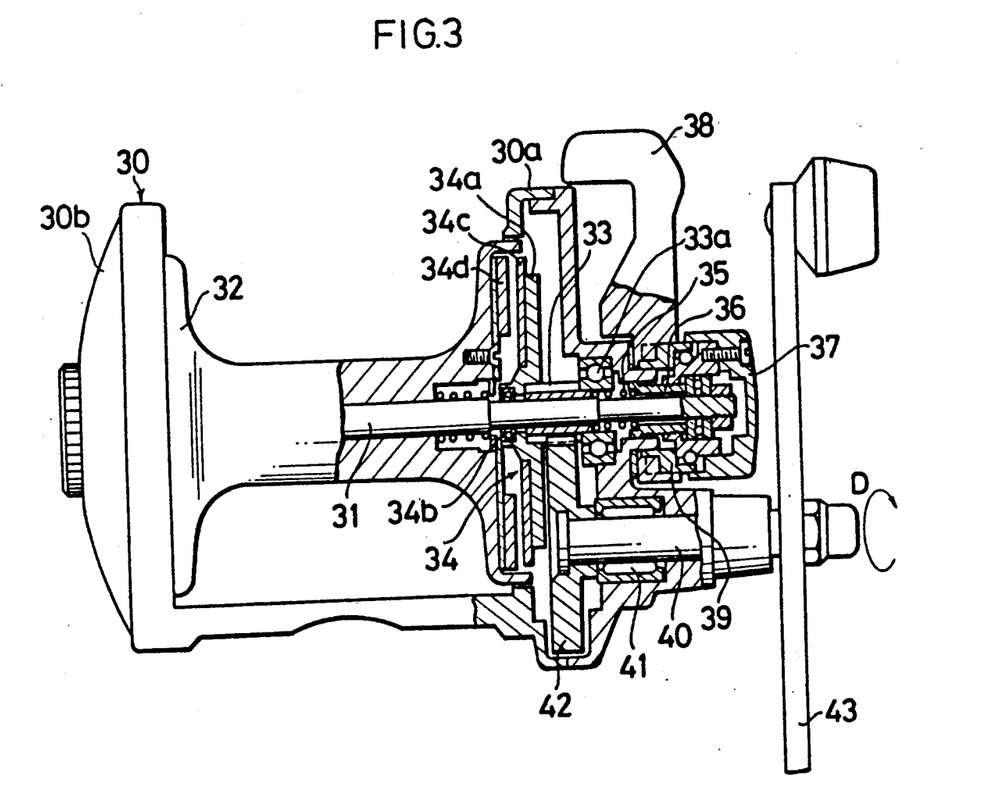
FIG. 3 is a partially-sectioned front view showing a third embodiment in which the anti-reverse mechanism according to the present invention is applied to a double-bearing type reel.

FIG. 3 shows a third embodiment in which the one-way bearing for prevention of reverse rotation according to the present invention is applied to a double-bearing type reel.

In the figure, a spool shaft 31 is horizontally carried between right- and left-hand frames 30a and 30b of a reel body 30 in such a manner that the spool shaft 31 is movable along the axis thereof, and a spool 32 is supported on the spool shaft 31 in such a manner that the spool 32 is unable to rotate relative to the shaft 31. A pinion 33 is fitted on that portion of the spool shaft 31 which is disposed within the right-hand frame 30a in such a manner that the pinion 33 is rotatable and axially movable relative to the spool shaft 31. The pinion 33 is further supported by the right-hand frame 30a through a bearing 33a. One end of the pinion 33 is connected to a pressing plate 34a which constitutes a drag mechanism 34. The drag mechanism 34 comprises the pressing plate 34a which is rotatably fitted on the spool shaft 31 through a bearing 34b in such a manner as to face the side surface of the spool 32, a friction plate 34c which is rigidly secured to that surface of the pressing plate 34a which faces the spool 32, and a friction plate 34d which is rigidly secured to that surface of the spool 32 which faces the pressing plate 34a so that the friction plate 34d is engageable with the friction plate 34c. The reference numeral 35 denotes a spring for pressing the friction plate 34c secured to the pressing plate 34a so that the friction plate 34c engages with the friction plate 34d secured to the spool 32. The spring 35 is interposed between the other end of the pinion 33 and a thread member 36 which is supported on the spool shaft 31 in such a manner as to face the second end of the pinion 33. A knob 37 for adjusting the level of drag force is screwed onto the thread member 36. The reference numeral 38 denotes a control lever actuated to engage and disengage the drag mechanism 34, the lever 38 being pivotally attached to the reel body 30. The pivotally supported proximal portion of the control lever 38 is engaged with the knob 37 through a cam member 39. Accordingly, when the control lever 38 is pivoted so as to activate the spool shaft 31, together with the knob 37 and the thread member 36, to move axially through the cam member 39, the spool 32 which is supported on the spool shaft 31 moves toward or away from the pressing plate 34a of the drag mechanism 34, thereby allowing the spool 32 and the pinion 33 to be connected together or disconnected from each other.

The reference numeral 40 denotes a driving shaft which is provided on the right-hand frame 30a such as to extend parallel to the spool shaft 31. The driving shaft 40 is supported on the right-hand frame 30a through a one-way bearing 41 for prevention of reverse rotation in such a manner that the driving shaft 40 is rotatable only in one direction. A driving gear 42 which is meshed with the pinion 33 is rigidly secured to that end portion of the driving shaft 40 which projects inside the right-hand frame 30a, and a retrieving handle 43 is secured to that end portion of the driving shaft 40 which projects outward from the right-hand frame 30a.

In the double-bearing type reel arranged as described above, when the handle 43 is turned in the direction of the arrow D shown in FIG. 3, the driving shaft 40 is free with respect to the one-way bearing 41 and therefore is rotated. The rotation of the driving shaft 40 is transmitted to the pressing plate 34a of the drag mechanism 34 and further transmitted to the spool 32 through the friction plates 34c and 34d which are in engagement with each other. Accordingly, the spool 32 is rotated in the retrieving direction and the fishing line (not shown) is wound on the spool 32.

When pulling force acts on the line in the direction in which it is unwound, the spool 32 is urged to rotate in the unwinding direction, but the one-way bearing 41 supporting the driving shaft 40 is activated to block the spool 32 from rotating in the unwinding direction. When pulling force which is larger than the drag force of the drag mechanism 34 acts on the line, the friction plates 34c and 34d of the drag mechanism 34 slip relative to each other, so that the spool 32 rotates in the unwinding direction to prevent disconnection of the line.

It should be noted that the spool 32 is set free when the pressing plate 34a is separated from the side surface of the spool 32 by actuating the lever 38, as shown in FIG. 3.

In the case of the foregoing third embodiment of the present invention also, the same advantages as those in the first embodiment are obtained.

Figure 4:
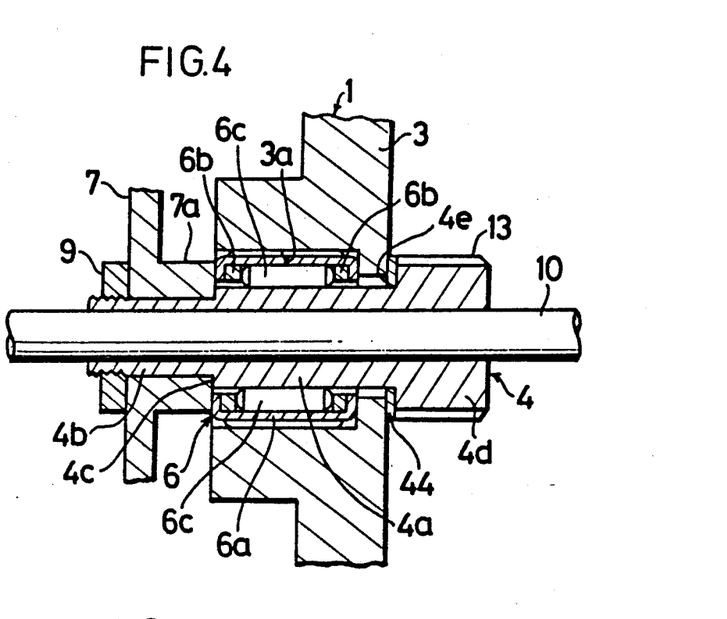
FIG. 4 is a fragmentary sectional view showing a fourth embodiment of the present invention.

FIG. 4 is a fragmentary sectional view showing a fourth embodiment in which the one-way bearing for prevention of reverse rotation according to the present invention is adapted to serve also a bearing for a rotary member.

In the figure, a stepped cylindrical bore 3a is bored in a front wall 3 of a reel body 1. The outer ring 6a of a one-way bearing 6 is fitted into the cylindrical bore 3a. The intermediate shaft portion 4a of a flyer shaft 4 is disposed such as to be inscribed in a plurality of rollers 6c arranged annularly by means of a retainer 6b on the inner periphery of the outer ring 6a. Thus, the flyer shaft 4 is carried in such a manner that it is allowed to rotate only in one direction but blocked from rotating in the other direction. A boss portion 7a of a flyer 7 is fitted on the smaller-diameter shaft portion 4b of the flyer shaft 4 which projects outward from the front wall 3 of the reel body 1, so that it is possible to secure the flyer 7 on the smaller-diameter shaft portion 4b by means of a nut 9 screwed onto the distal end of the smaller-diameter shaft portion 4b and the step portion 4c defined between the intermediate shaft portion 4a and the smaller-diameter shaft portion 4b. In this case, the end face of the boss portion 7a of the flyer 7 is brought into contact with the end face of the outer ring 6a of the one-way bearing 6 so as to prevent the bearing 6 from falling out of the bore 3a.

In addition, a pinion 13 is formed on the outer periphery of the larger-diameter portion 4d of the flyer shaft 4 which projects from the front wall 3 so as to extend inside the reel body 1. The step portion 4e defined between the larger-diameter portion 4b and the intermediate shaft portion 4a is engaged with the edge of the cylindrical bore 3a through a slide member 44, thereby suppressing the movement of the flyer shaft 4 in the direction of thrust. It should be noted that the reference numeral 10 denotes a spool shaft which extends through the axial bore in the flyer shaft 4.

In the flyer shaft supporting mechanism arranged as described above, the one-way bearing 6 has both the anti-reverse function and the bearing function and therefore it is possible to omit the radial bearing 5 shown in FIG. 1.

Figure 5:
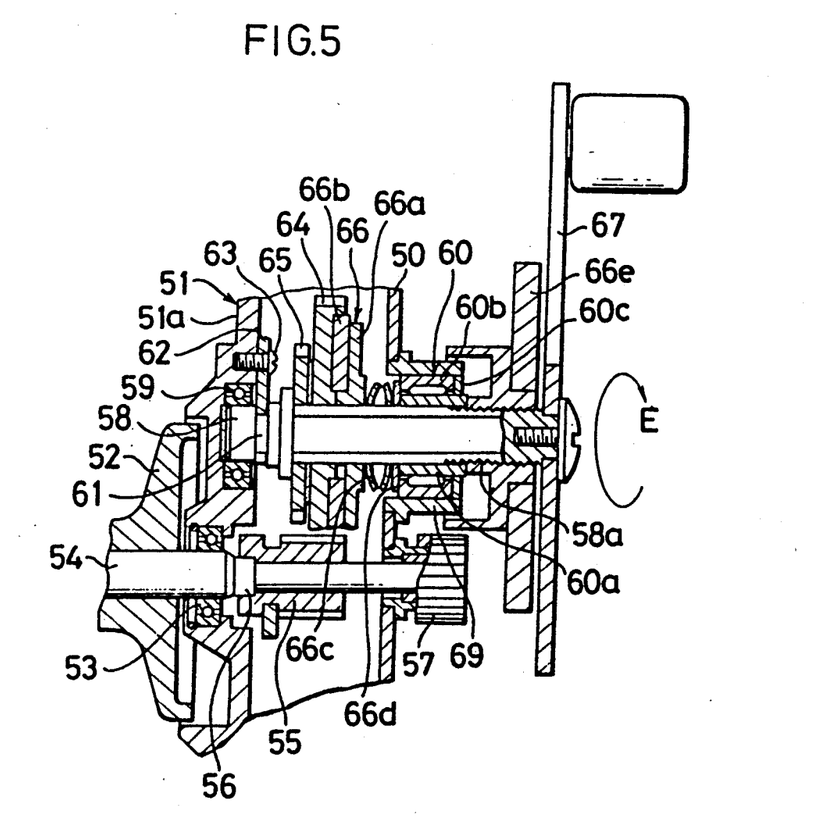
FIG. 5 is a fragmentary sectional view showing a fifth embodiment of the present invention.

FIG. 5 shows a fifth embodiment in which the one-way bearing for prevention of reverse rotation according to the present invention is applied to a double-bearing type reel for fishing.

In the figure, the reference numeral 50 denotes a right-hand outer plate which is secured to a support plate 51a of a body frame 51 in such a manner that the outer plate 50 surrounds the outer surface of the support plate 51a. The numeral 52 denotes a spool which is disposed inside the frame 51, the spool 52 being coaxially secured to a spool shaft 54 which is rotatably carried between the support plate 51a and the other support plate (not shown) through a bearing 53. The numeral 55 denotes a pinion which is rotatably mounted on the projecting portion of the spool shaft 54 which extends through the support plate 51a and projects into the space defined between the support plate 51a and the right-hand outer plate 50. The pinion 55 is able to come into and out of engagement with a clutch portion 56 which is formed on the projecting portion of the spool shaft 54. As is well known, this clutching/declutching operation is effected by means of an actuating member (not shown) which is horizontally carried between the two support plates. The reference numeral 57 denotes a braking mechanism which is provided outside the right-hand outer plate 50 for applying a mechanical brake to the spool shaft 52.

The reference numeral 58 denotes a handle shaft, or rotary shaft member is stretched (extended) between the support plate 51a and the right-hand outer plate 50 in parallel to the spool shaft 54. One end of the handle shaft 58 is rotatably supported by the support plate 51a through a bearing 59, while the other end portion of the shaft 58 is rotatably supported through a bearing unit 60 which is slidable but prevented from rotating or retained within a reel body cylindrical portion 69 provided on the right-hand outer plate 50. As is clear from FIG. 5, the longitudinal axis of shaft 58 is parallel and proximate to the axis of spool shaft 54 so that shaft 58 need not extend radially beyond the periphery of the base of spool 52. In addition, a ring-shaped groove 61 is formed in the outer periphery of the first (or inner) end portion of the handle shaft 58, and a fall preventing member 62 which is engaged with the groove 61 is rigidly secured to the support plate 51a by means of a screw 63, thereby restricting the axial movement of the handle shaft 58 and, at the same time, allowing the handle shaft 58 to be stably retained on the support plate 51a even if the second (or outer) end of the shaft 58 is not supported by the bearing unit 60. Further, a driving gear 64 (shown broken away) which is meshed with the pinion 55 is mounted on that portion of the handle shaft 58 which is disposed inside the right-hand outer plate 50 in such a manner that the driving gear 64 is axially movable and rotatable relative to the handle shaft 58. A ratchet gear 65 for prevention of reverse rotation is mounted on the handle shaft 58 adjacent to the driving gear 64 in such a manner that the ratchet gear 65 is axially movable but unable to rotate relative to the handle shaft 58. The reference numeral 66 denotes a drag mechanism for friction-coupling together the driving gear 64 and the handle shaft 58 to generate rotational torque applied to the spool 52. The drag mechanism 66 comprises a pressing plate 66a which is mounted on the handle shaft 58 in such a manner that the plate 66a is axially movable but unable to rotate relative to the handle shaft 58, a friction plate 66b which is disposed between the opposing side surfaces of the pressing plate 66a and the driving gear 64, and a leaf spring 66c for adjusting the level of drag force, a spring retainer 66d which is interposed between the leaf spring 66c and the bearing unit 60, and a knob 66e for adjusting the level of drag force which is screwed onto a thread portion 58a formed at the second end of the handle shaft 58. The reference numeral 67 denotes a rotatable handle which is rigidly secured to the second end of the handle shaft 58.

The bearing unit 60 comprises a collar 60a which is mounted on the handle shaft 58 in such a manner that the collar 60a is axially movable on the handle shaft 58 but prevented from rotating relative to it, a one-way bearing 60b for prevention of reverse rotation which is mounted on the collar 60a and fitted in the reel body cylindrical portion 69, a felt member 60c which is secured to one end portion of the one-way bearing 60b, and a spring retainer 66d which is mounted on the other end portion of the bearing 60b.

In the fishing reel arranged as described above, when the handle 67 is turned in the direction of the arrow E, clockwise, shown in FIG. 5, the handle shaft 58 is free with respect to the one-way bearing 60b and therefore rotated together with the handle 67 in the same direction. Also, the driving gear 64 which is friction-coupled thereto, through the drag mechanism 66 is rotated in the same direction, and the rotation of the gear 64 is transmitted to the spool 52 through the pinion 55, the clutch portion 56 and the spool shaft 54, so that the fishing line (not shown) is wound on the spool 52 as it rotates.

When pulling force acts on the line in the direction in which it is unwound, the spool 52 is urged to rotate in the unwinding direction, but the one-way bearing 60b supporting the driving shaft 58 is activated to block the spool 52 from rotating in the unwinding direction. When pulling force which is larger than the drag force of the drag mechanism 66 acts on the line, the pressing plate 66a and the friction plate 66b of the drag mechanism 66 slip relative to each other, so that the spool 52 rotates in the unwinding direction to prevent disconnection or breakage of the line.

As has been described above, according to the present invention, a one-way bearing is provided between a rotary shaft member (or handle shaft) which is rotated by actuating a handle and a reel body which supports the rotary member so that prevention of reverse rotation of the rotary member is effected by the function of the one-way bearing. Therefore, the anti-reverse mechanism can be compactly unitized and this facilitates the operation of incorporating the anti-reverse mechanism into the reel body and also the disassembling operation. Thus, the operability is improved. In addition, because the rotary shaft member slipping angle at the time when the one-way bearing effects an anti-reverse operation is small, prevention of reverse rotation is reliable impact applied to the mechanism at the moment when the anti-reverse operation is effected is minimized.

Figure 6:
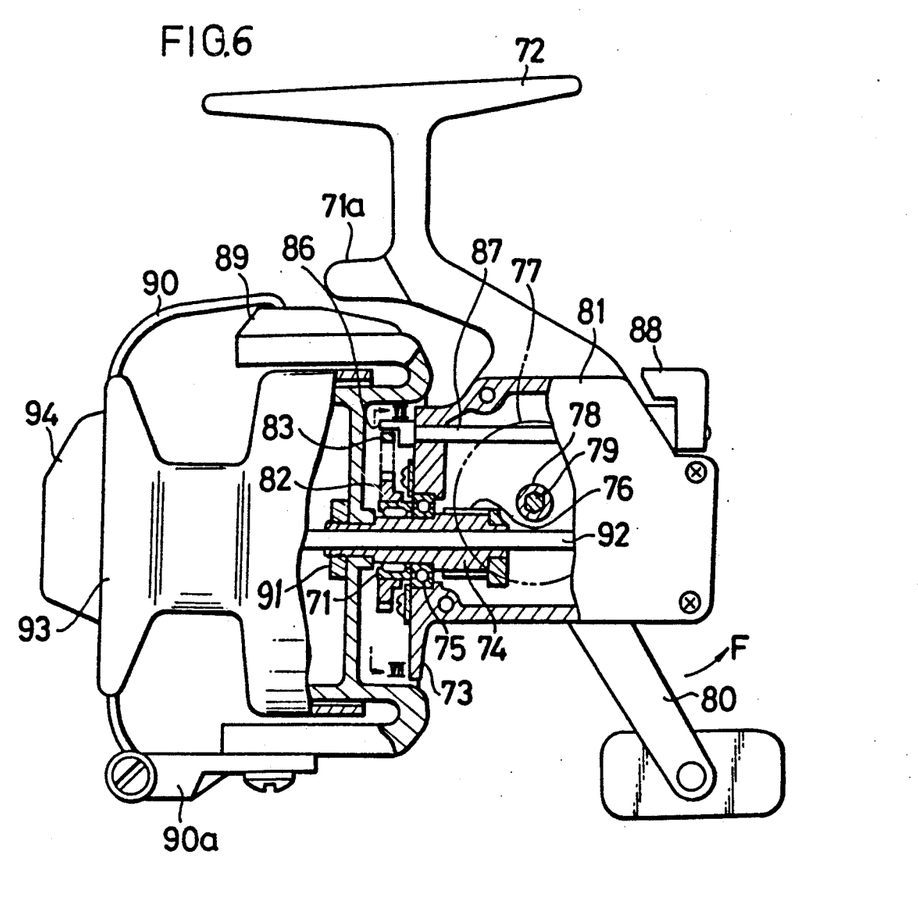
FIG. 6 is a partially-sectioned side view showing a sixth embodiment in which the anti-reverse mechanism according to the present invention is applied to a spinning reel.

FIG. 6 is a partially-sectioned side view showing a sixth embodiment in which the anti reverse mechanism according to the present invention is applied to a spinning reel.

In the figure, the reference numeral 71 denotes a reel body having a mounting leg 72 which is secured to a fishing rod when the reel is mounted thereon. A hollow flyer shaft 74 extends perpendicularly through a front wall 73 of the reel body 1. The flyer shaft 74 is rotatably carried by means of a bearing 75.

A pinion 76 is formed on the outer periphery of that portion of the flyer shaft 74 which projects inside the reel body 71, the pinion 76 being meshed with a driving gear 77 which is disposed inside the reel body 71. The driving gear 77 is secured to a hollow driving shaft 78 which is rotatably carried by the reel body 71 in such a manner that the driving shaft 78 extends perpendicular to the flyer shaft 74. A handle shaft 79 is rigidly fitted into the hollow driving shaft 78, and a handle 80 for winding in the line is secured to that end portion of the handle shaft 79 which projects outward from the reel body 71.

Figure 7:
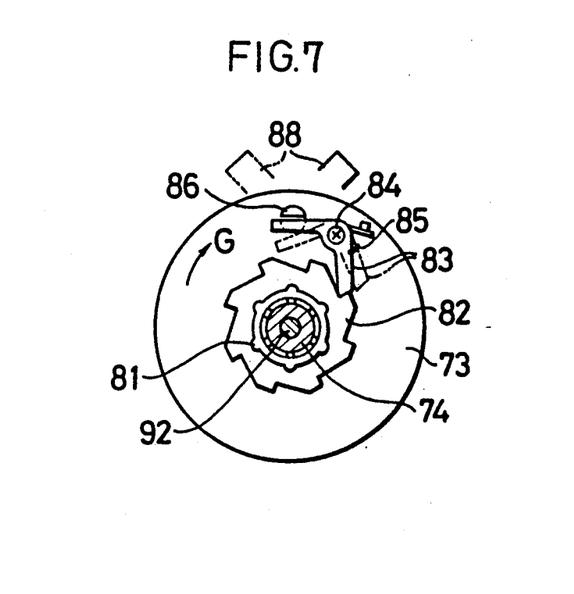
FIG. 7 is a sectional view taken along the line VII—VII of FIG. 6.

As shown in FIGS. 6 and 7, a one-way bearing 81 is fitted on the outer periphery of that portion of the flyer shaft 74 which projects outward from the reel body 71, and a ratchet wheel 82 is concentrically fitted on the outer periphery of the one-way bearing 81 in such a manner that the ratchet wheel 82 is unable to rotate relative to the one-way bearing 81. The reference numeral 83 denotes a V-shaped pawl which is pivotally attached to the front wall 73 of the reel body 71 through a screw pin 84 in close proximity to the ratchet wheel 82. One end of the pawl 83 is biased by a spring 85 in the direction in which it is engaged with the ratchet wheel 82, while the other end of the pawl 83 is engaged with a cam 86 whereby the pawl 83 is actuated to come in and out of engagement with the ratchet wheel 82. The cam 86 is rigidly secured to a rod 87 which extends longitudinally through the reel body 71 so as to be supported thereby. A switching lever 88 is rigidly secured to that end of the rod 87 which projects outward from the reel body 71.

In FIG. 6, the reference numeral 89 denotes a flyer which is disposed at the front side of the reel body 71. The flyer 89 has a bail 90 and is concentrically fitted on the distal end portion of the flyer shaft 74. The flyer 89 is rigidly fastened to the flyer shaft 74 by means of a nut 91 which is screwed onto the shaft 74. The reference numeral 92 denotes a spool shaft which extends through the bore in the flyer shaft 74 and which is supported therein in such a manner that it is axially slidable but unable to rotate relative to the flyer shaft 74. A spool 93 is mounted on the forward projecting end portion of the spool shaft 92 in such a manner that the spool 93 is rotatable relative to the spool shaft 92. The spool 93 and the spool shaft 92 are friction-coupled together through a drag mechanism 94. That end of the spool shaft 92 which projects inside the reel body 71 is connected to an oscillating mechanism (not shown) which causes the spool 93 to reciprocate longitudinally in synchronism with the rotation of the flyer 89.

The following is a description of the operation of the spinning reel of this embodiment arranged as described above.

Referring to FIG. 7, if the switching lever 88 is actuated to the position shown by the solid line, the pawl 83 is pivoted clockwise as viewed in the figure by the action of the spring 85 and the one end of the pawl 83 is thereby engaged with the ratchet wheel 82, thus preventing the ratchet wheel 82 from rotating counterclockwise as viewed in the figure.

To let out the fishing line (not shown) wound on the spool 93 in this state, the rod is vigorously swung down with the bail 90 set free. Thus, the line is successively unwound from the spool 93. At this time, the ratchet wheel 82 is engaged with the pawl 83 and the ratchet wheel 82 and the flyer shaft 74 are engaged with each other through the one-way bearing 81 such that reverse rotation is blocked. Moreover, since the one-way bearing 81 is of the type that rollers which constitute the bearing 81 are engaged in the shape of wedges between the outer periphery of the flyer shaft 74 and the outer ring of the bearing 81 to thereby perform a locking operation, the slipping angle is small. Accordingly, even if the fishing rod is vigorously swung down to let out the line, there is substantially no fear of the handle 80 being rotated by inertia. Therefore, there is no possibility that the arm 90a of the bail 90 set free will bump against the bail return member 71a provided on the reel body 71 as in the case of the prior art, and there is therefore no risk of the bail 90 being undesirably set in the retrieve position when the rod is swung down.

When the handle 80 is turned in the retrieving direction indicated by the arrow F in FIG. 6, the rotation of the handle 80 is transmitted from the handle shaft 79 to the flyer shaft 74 through the driving shaft 78, the driving gear 77 and the pinion 76, thereby rotating both the flyer 89 and the bail 90 and thus winding the line on the spool 93. At this time, the one-way bearing 81 is free with respect to the rotation of the flyer shaft 74 in the direction of the arrow G shown in FIG. 7, so that the ratchet wheel 82 is not substantially rotated.

In the case where the rod is bent to a large extent and tension is suddenly applied to the line during a retrieving operation due to the fact that the hook connected to the line is caught by an obstacle on the bottom of the water or a fish catches the hook, both the ratchet wheel 82 and the one-way bearing 81 bear the load applied to the anti-reverse mechanism. Accordingly, no impact load is applied to the pawl 83 and the screw pin 84 supporting it, and there is no fear of any trouble in terms of strength. In addition, since the slipping angle at the time when the anti-reverse operation is effected is small, no slack is generated in the line. Thus, it is possible to reliably prevent reverse rotation.

If the switching lever 88 is set in the position shown by the two-dot chain line in FIG. 7, the pawl 83 is disengaged from the ratchet wheel 82, so that the flyer shaft 74 is set free to rotate in both the rewinding and unwinding directions. The flyer shaft 74 is set in this free state when the line is to be released or the angler fights with the hooked fish.

Figure 8:
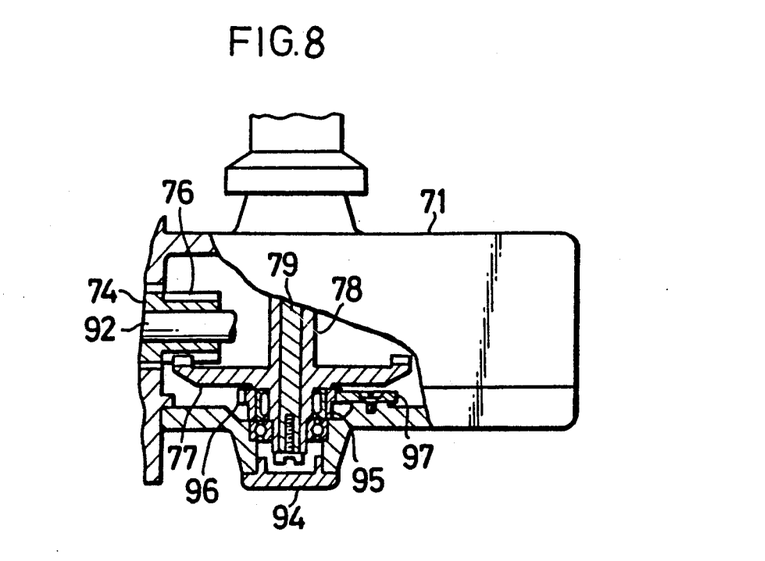
FIG. 8 is a fragmentary sectional view showing a seventh embodiment of the present invention.

FIG. 8 is a fragmentary sectional view of a seventh embodiment in which the anti-reverse mechanism according to the present invention is provided on the handle shaft of a spinning reel.

In FIG. 8, the same members or portions as those in FIG. 6 are denoted by the same reference numerals, and description of the same elements as those in the sixth embodiment is omitted. The seventh embodiment will be explained with emphasis on elements which are different from those shown in FIG. 6.

In this embodiment, as will be clear from FIG. 8, a hollow driving shaft 78 is rotatably carried by the reel body 71 through a bearing 94, and a one-way bearing 95 is fitted on the outer periphery of one end portion of the driving shaft 78. A ratchet wheel 96 is fitted on the outer periphery of the one-way bearing 95 in such a manner that the ratchet wheel 96 is unable to rotate relative to the bearing 95. Further, a pawl 97 which is similar to that shown in FIG. 7 is pivotally attached to the reel body 71, the pawl 97 being selectively brought into and out of engagement with the ratchet wheel 96.

In the seventh embodiment arranged as described above also, the same advantages as those in the sixth embodiment are obtained.

Figure 9:
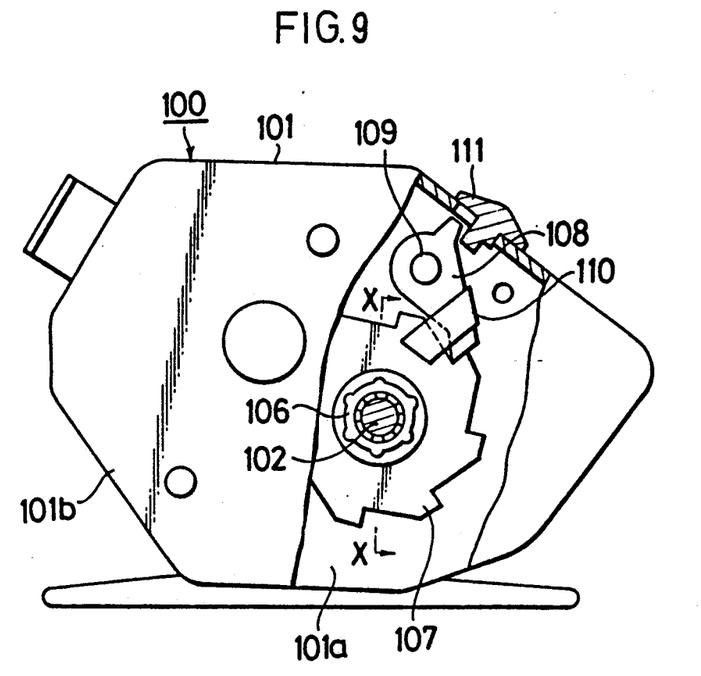
FIG. 9 is a partially-sectioned side view showing an eighth embodiment in which the anti-reverse mechanism according to the present invention is applied to a doublebearing type reel.
Figure 10:
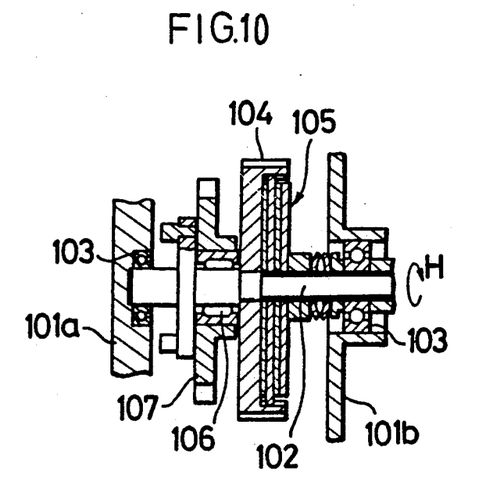
FIG. 10 is a sectional view taken along the line X—X of FIG. 9.

FIGS. 9 and 10 show in combination an eighth embodiment in which the anti-reverse mechanism according to the present invention is applied to a double-bearing type reel.

In the figure, the reference numeral 100 denotes a reel body. A handle shaft 102 is rotatably supported through bearings 103 between a pair of inner and outer plates 101a and 101b of one side frame 101 that constitutes the reel body 100. A driving gear 104 is supported on the handle shaft 102 in such a manner that the gear 104 is rotatable relative to the shaft 102, and the driving gear 104 and the handle shaft 102 are friction-coupled together through a drag mechanism 105. A one-way bearing 106 is fitted on the outer periphery of the handle shaft 102, and a ratchet wheel 107 is fitted on the outer periphery of the one-way bearing 106 in such a manner that the ratchet wheel 107 is unable to rotate relative to the bearing 106. A pawl 108 which is selectively brought into and out of engagement with the ratchet wheel 107 is pivotally attached to the inner plate 101a through a pin 109 in the vicinity of the ratchet wheel 107. The pawl 108 is biased by a leaf spring 110 in the direction in which the pawl 108 is engaged with the ratchet wheel 107. Further, the pawl 108 is arranged such as to be selectively switched between two positions, that is, one position where it is engaged with the ratchet wheel 107 and the other position where the former is disengaged from the latter, by actuating a switching lever 111 which is provided outside the side frame 101.

In the double-bearing type reel arranged as described above, when the handle shaft 102 is turned in the direction of the arrow H shown in FIG. 10, since the handle shaft 102 is free with respect to the one-way bearing 106 which is fixedly retained through the ratchet wheel 107 and the pawl 108, the handle shaft 102 is rotated clockwise as viewed in FIG. 9, and the rotation of the handle shaft 102 is transmitted to the spool (not shown) through the driving gear 104.

When tension is suddenly applied to the line which is being unwound from the spool, the spool is urged to rotate in the unwinding direction, but the one-way bearing 106 locks the spool from rotating in the unwinding direction. When tension which is larger than the drag force of the drag mechanism 105 acts on the line, the drag mechanism 105 slips, so that the driving gear 104 rotates relative to the handle shaft 104 which is in a locked state, together with the spool, thus preventing disconnection of the line.

In the foregoing eighth embodiment of the present invention also, the same advantages as those in the sixth embodiment are obtained.

As has been described above, according to the present invention, a one-way bearing is fitted on the outer periphery of a rotary member which is rotated by actuating a handle, while a ratchet wheel is fitted on the outer periphery of the one-way bearing in such a manner that the ratchet wheel is unable to rotate relative to the bearing, and a pawl is arranged to come in and out of engagement with the ratchet wheel. Therefore, it is possible to reliably prevent reverse rotation and minimize the slipping angle at the time when the anti-reverse operation is effected. As a result, even if tension is suddenly applied to the line due to draw of the rod by way of example, the impact applied to the anti-reverse mechanism is small and the impact force is shared between the ratchet wheel and the one-way bearing. Accordingly, the anti-reverse mechanism has no trouble in terms of strength, and the line has no slack therein.

Even when the rod is vigorously swung down to let out the line, there is no fear of the handle arm being rotated by inertia, which would otherwise cause the rotary member connected to the handle arm to rotate, resulting in the bail being undesirably set in the retrieve position.

It should be noted that the anti-reverse system of the present invention may, of course, be applied to closed-face type reels, single-bearing type reels, etc. in addition to spinning reels and double-bearing type reels such as those exemplarily shown in the foregoing embodiments.

What is claimed is:

1. A fishing reel of the type in which the rotation of a handle supported on a reel body is transmitted to a spool through a rotation transmission system incorporated in the reel body, wherein the improvement comprises: a one-way bearing fitted on the outer periphery of a rotary member rotated by actuating said handle; a ratchet wheel fitted on the outer periphery of said one-way bearing in such a manner that said ratchet wheel is unable to rotate relative to said bearing; and a pawl disengageably engaged with said ratchet wheel.

* * * * *